(12) United States Patent
Chen et al.

(10) Patent No.: US 9,398,510 B2
(45) Date of Patent: Jul. 19, 2016

(54) HANDOVER METHOD, BASE STATION, USER EQUIPMENT, AND MOBILITY MANAGEMENT ENTITY

(71) Applicant: HUAWEI TECHNOLOGIES CO., LTD., Shenzhen (CN)

(72) Inventors: Jing Chen, Shanghai (CN); Boyun Xie, Xi'an (CN); Tao Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 171 days.

(21) Appl. No.: 14/082,480

(22) Filed: Nov. 18, 2013

(65) Prior Publication Data

US 2014/0080449 A1  Mar. 20, 2014

Related U.S. Application Data

(63) Continuation of application No. PCT/CN2012/075765, filed on May 18, 2012.

(30) Foreign Application Priority Data

May 18, 2011  (CN) .......................... 2011 1 0128967

(51) Int. Cl.
*H04W 12/04* (2009.01)
*H04W 36/34* (2009.01)
(Continued)

(52) U.S. Cl.
CPC ............ *H04W 36/34* (2013.01); *H04L 63/205* (2013.01); *H04W 12/04* (2013.01); *H04W 36/0038* (2013.01)

(58) Field of Classification Search
None
See application file for complete search history.

(56) References Cited

U.S. PATENT DOCUMENTS

| 2003/0200431 A1* | 10/2003 | Stirbu | H04L 9/3271 713/168 |
| 2010/0054472 A1* | 3/2010 | Barany | H04L 63/0428 380/270 |
| 2010/0293372 A1* | 11/2010 | Fischer | H04W 12/06 713/168 |

(Continued)

FOREIGN PATENT DOCUMENTS

| CN | 1937487 | 3/2007 |
| CN | 101931951 | 12/2010 |

(Continued)

OTHER PUBLICATIONS

International Search Report mailed Aug. 23, 2012 in corresponding International Application No. PCT/CN2012/075765.

(Continued)

*Primary Examiner* — Daniel Lai
(74) *Attorney, Agent, or Firm* — Staas & Halsey LLP

(57) ABSTRACT

Embodiments of the present invention provide a handover method, base station, user equipment, and mobility management entity. The handover method includes: obtaining an algorithm used by a user equipment in a universal mobile telecommunication system and four least significant bits of a downlink non-access stratum count; and sending a handover command to the user equipment, where the handover command carries the algorithm used by the user equipment in the universal mobile telecommunication system and the four least significant bits of the downlink non-access stratum count, so that the user equipment calculates a cipher key and an integrity key according to the four least significant bits of the downlink non-access stratum count.

24 Claims, 6 Drawing Sheets

(51) Int. Cl.
*H04L 29/06* (2006.01)
*H04W 36/00* (2009.01)

(56) References Cited

U.S. PATENT DOCUMENTS

| | | | |
|---|---|---|---|
| 2011/0019644 A1* | 1/2011 | Cheon et al. | 370/331 |
| 2011/0092213 A1* | 4/2011 | Forsberg et al. | 455/436 |
| 2011/0222690 A1* | 9/2011 | Gan | 380/272 |
| 2012/0077501 A1 | 3/2012 | Zhang et al. | |
| 2012/0140731 A1* | 6/2012 | Drapkin et al. | 370/331 |
| 2012/0159151 A1* | 6/2012 | Janakiraman et al. | 713/153 |

FOREIGN PATENT DOCUMENTS

| | | |
|---|---|---|
| EP | 2 416 598 A1 | 2/2012 |
| GB | 2472580 A | 2/2011 |
| WO | 2009/150493 | 12/2009 |
| WO | 2010/149083 A1 | 12/2010 |
| WO | 2011/018931 | 2/2011 |

OTHER PUBLICATIONS

PCT International Search Report and Written Opinion of the International Searching Authority dated Aug. 23, 2012 in corresponding International Patent Application No. PCT/CN2012075765.

"$3^{rd}$ Generation Partnership Project; Technical Specification Group Services and System Aspects; 3GPP System Architecture Evolution (SAE); Security architecture (Release 10)", 3GPP TS 33.401 V10.0.0, Mar. 2011, pp. 113.

Extended European Search Report issued Jan. 29, 2014, in corresponding European Patent Application No. 12785849.6.

Chinese Office Action dated Jul. 9, 2015 in corresponding Chinese Patent Application No. 201110128967.4.

* cited by examiner

HANDOVER METHOD, BASE STATION, USER EQUIPMENT, AND MOBILITY MANAGEMENT ENTITY

CROSS-REFERENCE TO RELATED APPLICATIONS

This application is a continuation of International Application No. PCT/CN2012/075765, filed on May 18, 2012, which claims priority to Chinese Patent Application No. 201110128967.4, filed on May 18, 2011, both of which are hereby incorporated by reference in their entireties.

TECHNICAL FIELD

Embodiments of the present invention relate to the field of radio communications technologies, and in particular, to a handover method, a base station, a user equipment, and a mobility management entity.

BACKGROUND

With continuous development of mobile communications technologies and gradual network upgrade of operators, a global system for mobile communication (Global System of Mobile Communication; hereinafter referred to as GSM) network, a universal mobile telecommunication system (Universal Mobile Telecommunication System; hereinafter referred to as UMTS) network, and a long term evolution (Long Term Evolution; hereinafter referred to as LTE) network may coexist in a practical network. To ensure continuity and quality of a communication service of a user, it needs to ensure that the user can successfully perform handover between different networks.

Currently, handover from the UMTS to the GSM has been standardized, a current mechanism has relatively well solved a problem of algorithm negotiation and key negotiation in a handover process, and a user terminal supporting both UMTS access mode and GSM access mode has appeared in the market and is relatively widely applied. In the 3rd generation partnership project (3rd Generation Partnership Project; hereinafter referred to as 3GPP) standard, a mechanism of handover between the LTE network and the UMTS network is also established. However, handover delay of these existing handover technologies is relatively high.

In a handover solution of handing over from the LTE to the UMTS, a private interface X2-u is introduced to reduce handover delay, where the X2-u interface is an interface between an evolved NodeB (evolved NodeB; hereinafter referred to as eNB) and a radio network controller (Radio Network Controller; hereinafter referred to as RNC). However, this handover solution cannot solve the problem of inter-system key negotiation and algorithm negotiation, thereby resulting in relatively low handover security.

SUMMARY

Embodiments of the present invention provide a handover method, a base station, a user equipment, and a mobility management entity, to solve a problem of inter-system key algorithm and algorithm negotiation and enhance handover security.

An embodiment of the present invention provides a handover method, including:

obtaining an algorithm used by a user equipment in a universal mobile telecommunication system and four least significant bits of a downlink non-access stratum count; and sending a handover command to the user equipment, where the handover command carries the algorithm used by the user equipment in the universal mobile telecommunication system and the four least significant bits of the downlink non-access stratum count.

An embodiment of the present invention further provides a handover method, including:

receiving, by a user equipment, a handover command sent by a base station, where the handover command carries an algorithm used by the user equipment in a universal mobile telecommunication system and four least significant bits of a downlink non-access stratum count; and calculating, by the user equipment, a cipher key and an integrity key according to the four least significant bits of the downlink non-access stratum count.

An embodiment of the present invention further provides a handover method, including:

receiving, by a mobility management entity, a handover request message sent by a base station, where the handover request message carries instruction information for instructing the mobility management entity to send four least significant bits of a downlink non-access stratum count; and sending, by the mobility management entity, the four least significant bits of the downlink non-access stratum count to the base station according to the instruction information.

An embodiment of the present invention further provides a base station, including:

an obtaining module, configured to obtain an algorithm used by a user equipment in a universal mobile telecommunication system and four least significant bits of a downlink non-access stratum count; and a sending module, configured to send a handover command to the user equipment, where the handover command carries the algorithm used by the user equipment in the universal mobile telecommunication system and the four least significant bits of the downlink non-access stratum count that are obtained by the obtaining module.

An embodiment of the present invention further provides a user equipment, including:

a command receiving module, configured to receive a handover command sent by a base station, where the handover command carries an algorithm used by the user equipment in a universal mobile telecommunication system and four least significant bits of a downlink non-access stratum count; and a calculation module, configured to calculate a cipher key and an integrity key according to the four least significant bits of the downlink non-access stratum count that are received by the command receiving module.

An embodiment of the present invention further provides a mobility management entity, including:

a first message receiving module, configured to receive a handover request message sent by a base station, where the handover request message carries instruction information for instructing the mobility management entity to send four least significant bits of a downlink non-access stratum count; and a significant bit sending module, configured to send the four least significant bits of the downlink non-access stratum count to the base station according to the instruction information received by the first message receiving module.

With embodiments of the present invention, a base station can carry, in a handover command sent to a user equipment, an algorithm used by the user equipment in a universal mobile telecommunication system and four least significant bits of a downlink non-access stratum count, and then the user equipment can calculate a cipher key and an integrity key according to the obtained four least significant bits of the downlink non-access stratum count, and furthermore the user equipment can perform inter-system key negotiation with a mobility management entity according to the cipher key and the integrity key and perform algorithm negotiation with the mobility management entity according to the algorithm used by the user equipment in the universal mobile telecommunication system, so that handover security can be enhanced.

BRIEF DESCRIPTION OF DRAWINGS

To illustrate the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the aspects, technical solutions, and advantages of the embodiments of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
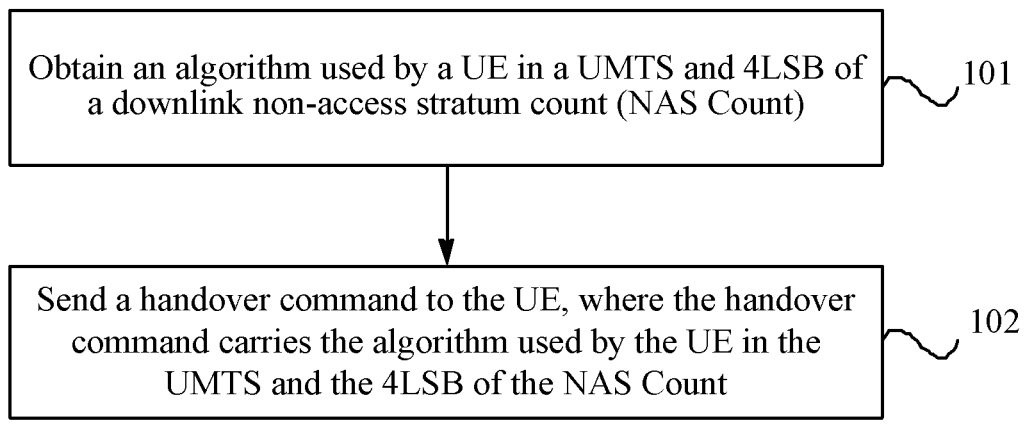
FIG. 1 is a flowchart of a handover method according to an embodiment of the present invention.

FIG. 1 is a flowchart of a handover method according to an embodiment of the present invention. As shown in FIG. 1, the handover method may include:

101. Obtain an algorithm used by a user equipment (User Equipment; hereinafter referred to as UE) in a UMTS and four least significant bits (4 Least Significant Bits; hereinafter referred to as 4LSB) of a downlink non-access stratum count (Non-Access Stratum Count; hereinafter referred to as NAS Count).

102. Send a handover command to the UE, where the handover command carries the algorithm used by the UE in the UMTS and the 4LSB of the NAS Count.

Furthermore, in an implementation manner of this embodiment, before the algorithm used by the UE in the UMTS and the 4LSB of the downlink NAS Count are obtained, a base station may further receive an S1 application protocol (S1 Application Protocol; hereinafter referred to as S1AP) message sent by a mobility management entity (Mobility Management Entity; hereinafter referred to as MME) when the UE accesses a network, where the S1AP message carries a security capability of the UE in the UMTS.

In this way, the obtaining the algorithm used by the UE in the UMTS may be: the base station sends a handover request message to an RNC, where the handover request message carries the security capability of the UE in a UTRAN; then, the base station may receive a handover request acknowledgement message sent by the RNC, where the handover request acknowledgement message carries the algorithm used by the UE in the UMTS, and the algorithm used by the UE in the UMTS is selected by the RNC according to the security capability.

In this implementation manner, the obtaining the 4LSB of the downlink NAS Count may be: the base station sends a handover request message to an MME, where the handover request message carries instruction information for instructing the MME to send the 4LSB of the downlink NAS Count; then, the base station may receive the 4LSB of the downlink NAS Count, and the 4LSB of the downlink NAS Count is sent by the MME according to the instruction information.

In this implementation manner, the obtaining the 4LSB of the downlink NAS Count may also be: the base station monitors and saves the downlink NAS Count, and generates a new NAS Count according to the saved downlink NAS Count; then the base station may obtain 4LSB of the new NAS Count.

Furthermore, after generating the new NAS Count according to the saved NAS Count, the base station may further send a handover request message to the MME, where the handover request message carries the new NAS Count, so that the MME calculates a cipher key (Cipher Key; hereinafter referred to as CK) and an integrity key (Integrity Key; hereinafter referred to as IK) according to the new NAS Count.

In this implementation manner, the base station may carry, in the handover command sent to the UE, the algorithm used by the UE in the UMTS and the 4LSB of the new NAS Count. In this way, after receiving the handover command, the UE can determine the NAS Count used by the MME according to the 4LSB of the NAS Count that is carried in the handover command and the NAS Count saved by the UE; then, the UE can calculate the CK and the IK according to the NAS Count used by the MME and a root key.

In this implementation manner, the base station may send the handover request message to the MME at the same time as, before, or after the base station sends the handover command to the UE, and the sequence of which the base station sends the handover request message to the MME and the base station sends the handover command to the UE is not limited in this implementation manner. That is, in this implementation manner, the base station does not need to send the handover command to the UE only after receiving the handover request response message sent by the MME, but can send the handover command to the UE after obtaining the 4LSB of the downlink NAS Count, thereby saving handover time.

In another implementation manner of this embodiment, before sending the handover command to the UE, the base station may further firstly send the handover request message to the MME, and then receive a handover request response message sent by the MME, where the handover request response message carries the algorithm used by the UE in the UMTS and the 4LSB of the downlink NAS Count. Next, the base station sends the handover command to the UE. That is, in this implementation manner, the base station can send the handover command to the UE only after receiving the handover request response message sent by the MME.

In the foregoing embodiment, the base station can carry, in the handover command sent to the UE, the algorithm used by the UE in the UMTS and the 4LSB of the downlink NAS Count, and then, the UE can calculate the CK and the IK according to the obtained 4LSB of the downlink NAS Count, and furthermore, the UE can perform inter-system key negotiation with the MME according to the CK and the IK and perform algorithm negotiation with the MME according to the algorithm used by the UE in the UMTS, so that handover security can be enhanced.

Figure 2:
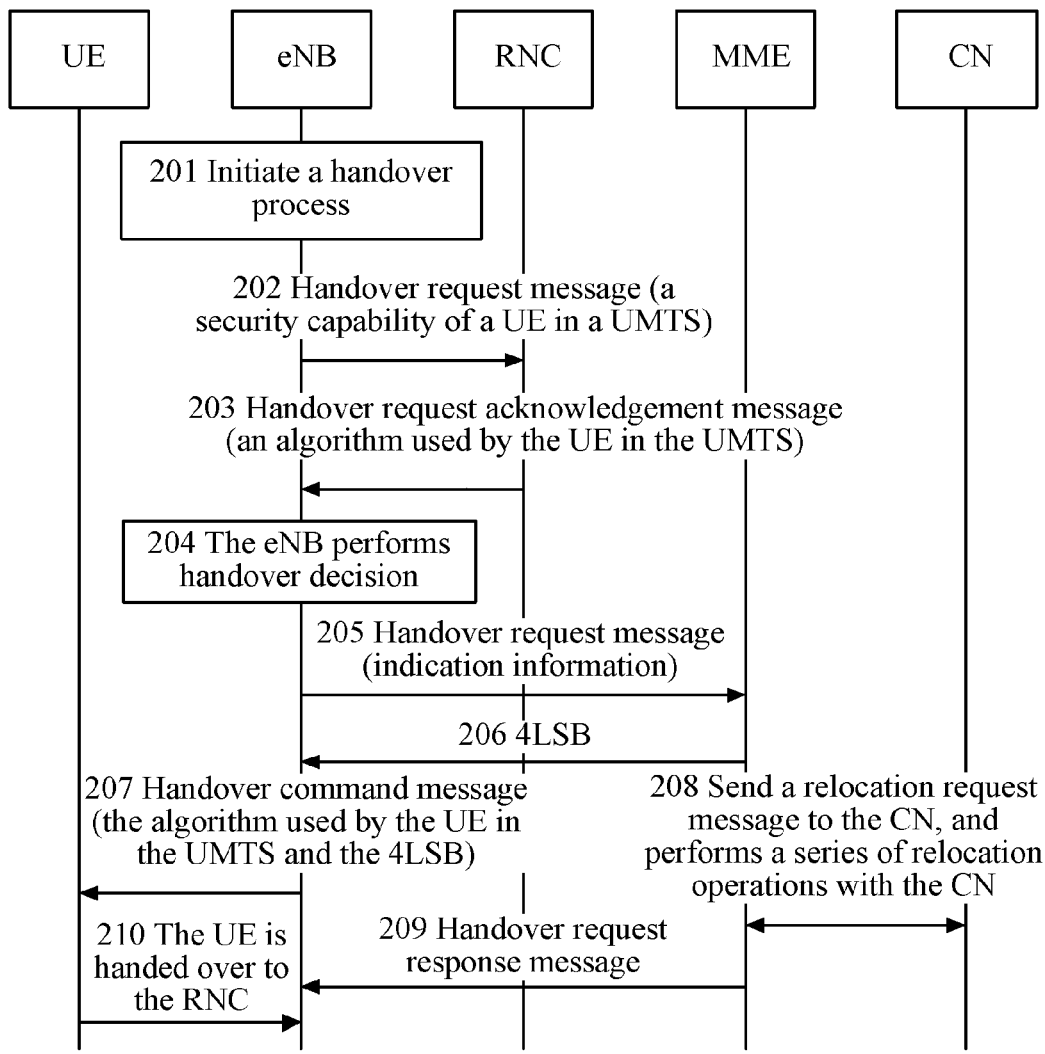
FIG. 2 is a flowchart of a handover method according to another embodiment of the present invention.

FIG. 2 is a flowchart of a handover method according to another embodiment of the present invention. As shown in FIG. 2, the handover method may include:

201. An eNB initiates a handover process.

202. The eNB sends a handover request (Handover Request) message to the RNC, where the handover request message carries a security capability of a UE in a UMTS.

In this embodiment, when a UE accesses a network via an LTE system, the UE sends security capabilities of the UE in an LTE system, a UMTS, and a GSM to a core network node MME. Therefore, in order to enable the eNB to obtain the security capabilities of the UE in the UMTS and the GSM, an S1AP message between the MME and the eNB may be extended to carry the security capabilities of the UE in the UMTS and the GSM. Specifically, when the UE accesses the network, the MME can send the security capabilities of the UE in the UMTS and the GSM together to the eNB in the S1AP message sent to the eNB.

203. After receiving the handover request message, the RNC performs operations such as quality of service (Quality of Service; hereinafter referred to as QoS) mapping and resource allocation, and sends a handover request acknowledgement (Handover Request Acknowledgement; hereinafter referred to as Handover Request ACK) message to the eNB, where the handover request acknowledgement message carries an algorithm used by the UE in the UMTS.

Specifically, the RNC may select the algorithm used by the UE in the UMTS according to the security capability of the UE in the UMTS that is carried in the handover request message, and send the selected algorithm to the eNB in the handover request acknowledgement message.

204. The eNB performs handover decision.

205. The eNB sends the handover request message to the MME, where the handover request message carries instruction information for instructing the MME to send 4LSB of a downlink NAS Count.

206. After receiving the instruction information, the MME sends the 4LSB of the downlink NAS Count to the eNB.

207. After receiving the 4LSB sent by the MME, the eNB sends a handover command (Handover Command) message to the UE, where the handover command message carries the algorithm used by the UE in the UMTS and the 4LSB of the downlink NAS Count.

In this embodiment, the eNB can send the handover command message to the UE after receiving the 4LSB of the downlink NAS Count, rather than waiting for receiving a handover request response message sent by the MME, thereby saving handover time.

208. The MME sends a relocation request (Relocation Request) message to a core network (Core Network; hereinafter referred to as CN), and performs a series of relocation operations with the CN.

209. The MME sends a handover request response (Handover Request Response) message to the eNB.

210. The UE is handed over to the RNC. The process of handover from the LTE system to the UMTS ends.

In the foregoing embodiment, a method is provided for the eNB to obtain the 4LSB of the downlink NAS Count. In addition to the method provided in the foregoing embodiment, there may be another method for the eNB to obtain the 4LSB of the downlink NAS Count, which specifically may be: the eNB monitors and saves the downlink NAS Count, before sending the handover request message to the MME, generates a new NAS Count according to the downlink NAS Count saved by the eNB, and obtains the 4LSB of the new NAS Count.

After the eNB generates the new NAS Count according to the downlink NAS Count saved by the eNB, in one aspect, the eNB can carry the new NAS Count in the handover request message and send the handover request message to the MME, and the MME can calculate a CK and an IK according to the new NAS Count value; in another aspect, the eNB can send the handover command message to the UE, where the handover command message carries the 4LSB of the generated new NAS Count. After receiving the handover command message, the UE can determine the NAS Count used by the MME according to the 4LSB and the downlink NAS Count saved by the UE itself, and then the UE can complete derivation of the CK and the IK by using the determined NAS Count used by the MME and a root key (Kasme) as an input. The eNB may send the handover request message to the MME at the same time as, before, or after the eNB sends the handover command message to the UE, and the sequence of which the eNB sends the handover request message to the MME and the eNB sends the handover command message to the UE is not limited in this embodiment.

In the foregoing embodiment, the eNB can carry, in the handover command message sent to the UE, the algorithm used by the UE in the UMTS and the 4LSB of the downlink NAS Count, and then, the UE can calculate the CK and the IK according to the obtained 4LSB of the downlink NAS Count, and furthermore, the UE can perform inter-system key negotiation with the MME according to the CK and the IK and perform algorithm negotiation with the MME according to the algorithm used by the UE in the UMTS, so that handover security can be enhanced.

Figure 3:
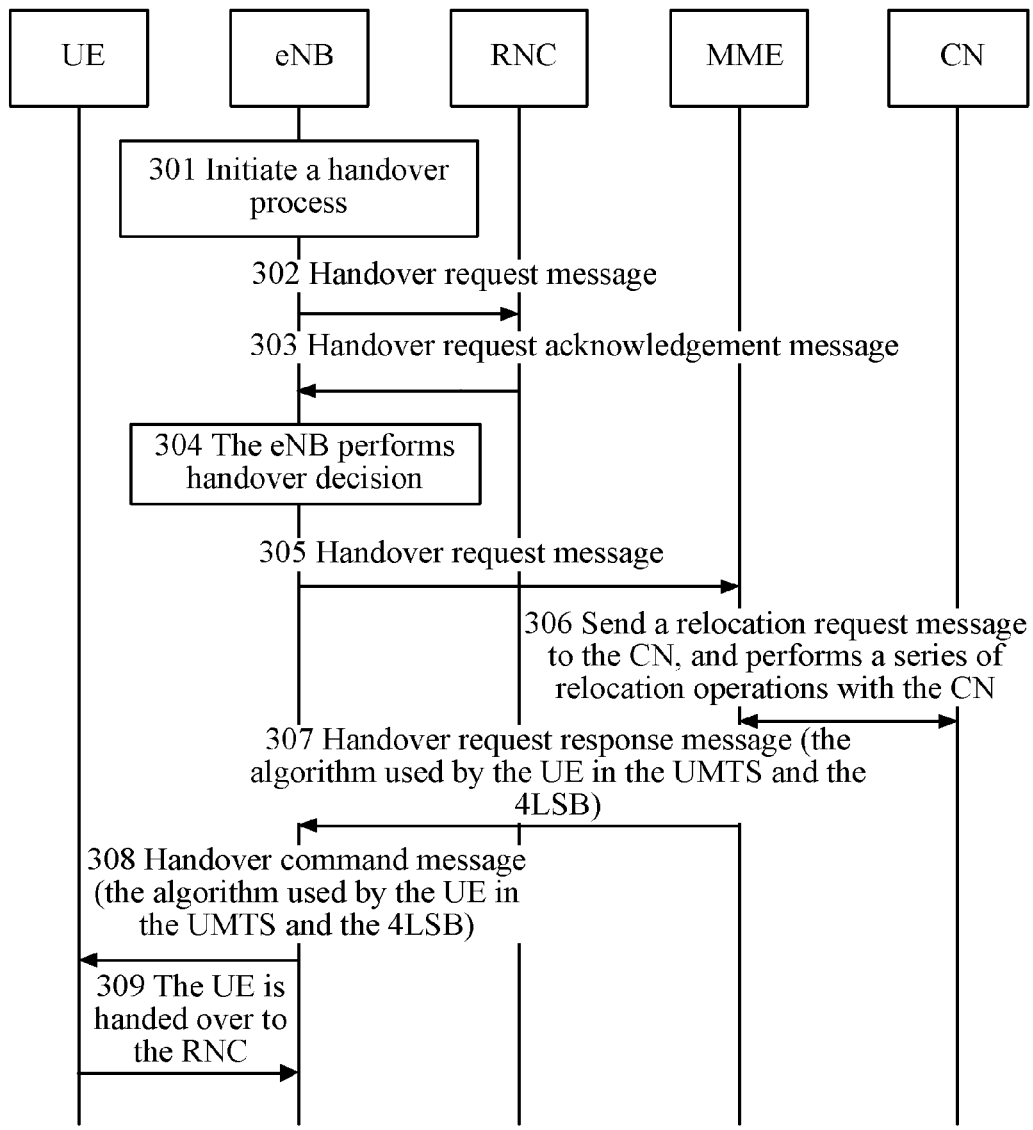
FIG. 3 is a flowchart of a handover method according to still another embodiment of the present invention.

FIG. 3 is a flowchart of a handover method according to still another embodiment of the present invention. As shown in FIG. 3, the handover method may include:

301. An eNB initiates a handover process.

302. The eNB sends a handover request message to an RNC.

303. After receiving the handover request message, the RNC performs operations such as QoS mapping and resource allocation, and sends a handover request acknowledgement message to the eNB.

304. The eNB performs handover decision.

305. The eNB sends a handover request message to an MME.

306. The MME sends a relocation request message to a CN, and performs a series of relocation operations with the CN.

Specifically, the MME may send a forward relocation request message to a core network node SGSN, where the forward relocation request message carries a security capability of a UE in a UMTS; the SGSN is short for serving general packet radio service support node (Serving General Packet Radio Service Support Node). The security capability of the UE in the UMTS is sent by the UE to the core network node MME when the UE accesses a network via an LTE system; then the SGSN sends the security capability of the UE in the UMTS to the RNC by the relocation request message, and the RNC selects an algorithm used by the UE in the UMTS according to the security capability of the UE in the UMTS; then the RNC sends the algorithm used by the UE in the UMTS to the SGSN in a relocation response message, and finally the SGSN sends the algorithm used by the UE in the UMTS to the MME by the relocation response message.

307. The MME sends a handover request response message to the eNB, where the handover request response message carries the algorithm used by the UE in the UMTS and the 4LSB of the downlink NAS Count.

308. The eNB sends a handover command message to the UE, where the handover command message carries the algorithm used by the UE in the UMTS and the 4LSB of the downlink NAS Count.

The eNB can send the handover command message to the UE only after receiving the 4LSB of the downlink NAS Count sent by the MME. Therefore, in this embodiment, the eNB is required to send the handover command message to the UE after receiving the handover request response message sent by the MME.

309. The UE is handed over to the RNC. The process of handover from the LTE system to the UMTS ends.

In the foregoing embodiment, after receiving the handover request response message sent by the MME, the eNB has obtained the algorithm used by the UE in the UMTS and the 4LSB of the downlink NAS Count, and only at this situation the eNB sends the handover command message to the UE, and the handover command message carries the algorithm used by the UE in the UMTS and the 4LSB of the downlink NAS Count, so that inter-system key negotiation and algorithm negotiation can be performed successfully, and handover security can be enhanced.

Figure 4:
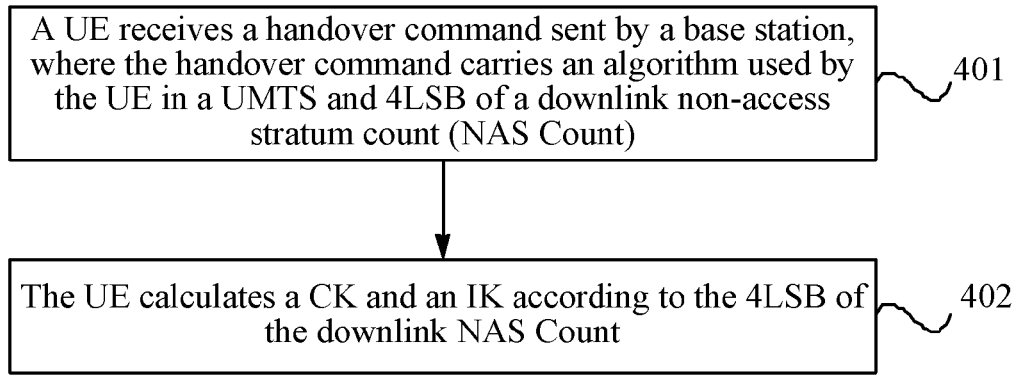
FIG. 4 is a flowchart of a handover method according to yet another embodiment of the present invention.

FIG. 4 is a flowchart of a handover method according to yet another embodiment of the present invention. As shown in FIG. 4, the handover method may include:

401. A UE receives a handover command sent by a base station, where the handover command carries an algorithm used by the UE in a UMTS and 4LSB of a downlink NAS Count.

402. The UE calculates a CK and an IK according to the 4LSB of the downlink NAS Count.

Specifically, the UE can determine the NAS Count used by the MME according to the 4LSB of the downlink NAS Count that is carried in the handover command and the downlink NAS Count saved in the UE; then, the UE calculates the CK and the IK according to the NAS Count used by the MME and a Kasme.

In the foregoing embodiment, after receiving the handover command sent by the base station, the UE can obtain the algorithm used by the UE in the UMTS and the 4LSB of the downlink NAS Count that are carried in the handover command, and then, the UE can calculate the CK and the IK according to the 4LSB of the downlink NAS Count, and then, the UE can perform inter-system key negotiation with the MME according to the CK and the IK and perform algorithm negotiation with the MME according to the algorithm used by the UE in the UMTS, so that handover security can be enhanced.

Figure 5:
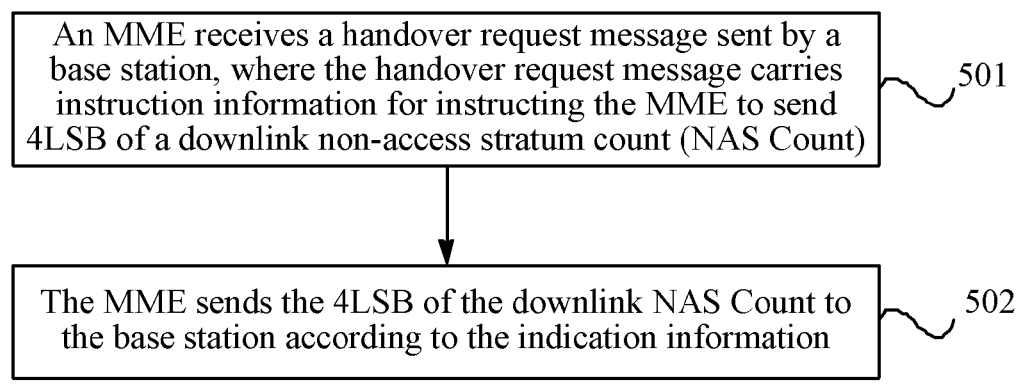
FIG. 5 is a flowchart of a handover method according to still yet another embodiment of the present invention.

FIG. 5 is a flowchart of a handover method according to still yet another embodiment of the present invention, as shown in FIG. 5, the handover method may include:

501. An MME receives a handover request message sent by a base station, where the handover request message carries instruction information for instructing the MME to send 4LSB of a downlink NAS Count.

502. The MME sends the 4LSB of the downlink NAS Count to the base station according to the instruction information.

In 501 of this embodiment, the instruction information for instructing the MME to send the 4LSB of the downlink NAS Count is 4LSB of a new NAS Count, where the new NAS Count is generated by the base station according to a monitored and saved downlink NAS Count; if the handover request message in 501 further carries the new NAS Count, the MME may further calculate a CK and an IK according to the new NAS Count.

Furthermore, in this embodiment, after receiving the handover request message sent by the base station, the MME may further send a handover request response message to the base station, where the handover request response message carries an algorithm used by a UE in a UMTS and the 4LSB of the downlink NAS Count.

In the foregoing embodiment, after receiving the handover request message sent by the base station, the MME sends the 4LSB of the downlink NAS Count to the base station according to the instruction information carried in the handover request message, so that the base station sends the 4LSB to the UE, and then, the UE can calculate the CK and the IK according to the 4LSB sent by the base station and the MME can also calculate the CK and the IK according to the downlink NAS Count corresponding to the 4LSB sent to the base station, and furthermore, the UE and the MME can perform inter-system key negotiation according to the respectively calculated CKs and IKs, so that handover security can be enhanced.

Figure 6:
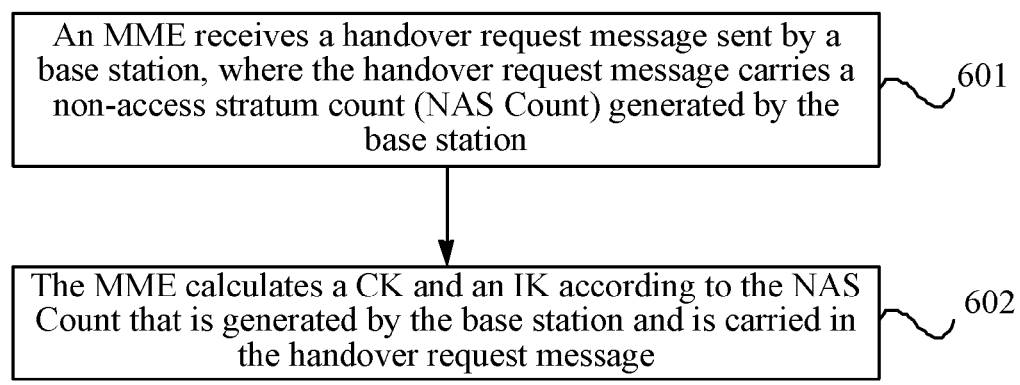
FIG. 6 is a flowchart of a handover method according to still yet another embodiment of the present invention.

FIG. 6 is a flowchart of a handover method according to still yet another embodiment of the present invention. As shown in FIG. 6, the handover method may include:

601. An MME receives a handover request message sent by a base station, where the handover request message carries an NAS Count generated by the base station.

602. The MME calculates a CK and an IK according to the NAS Count that is generated by the base station and is carried in the handover request message.

In the foregoing embodiment, the MME can calculate the CK and the IK according to the NAS Count generated by the base station, and then the MME can perform inter-system key negotiation with a UE according to the CK and the IK, so that handover security can be enhanced.

A person of ordinary skill in the art can understand: All or some steps for implementing the foregoing method embodiments can be completed by using a program to instruct relevant hardware, the program may be stored in a computer readable storage medium, and the program, during execution, performs the steps including the foregoing method embodiments; the storage medium includes: various media that can store program code, such as a ROM, RAM, magnetic disk, or optical disc.

Figure 7:
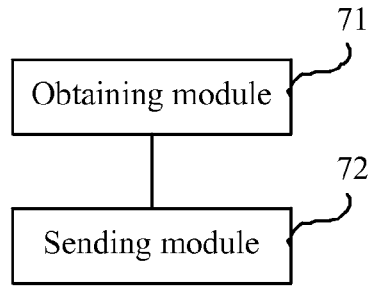
FIG. 7 is a schematic structural diagram of a base station according to an embodiment of the present invention.

FIG. 7 is a schematic structural diagram of a base station according to an embodiment of the present invention, and the base station in this embodiment can implement a process of the embodiment shown in FIG. 1 of the present invention. As shown in FIG. 7, the base station may include:

an obtaining module 71, configured to obtain an algorithm used by a UE in a UMTS and 4LSB of a downlink NAS Count; and a sending module 72, configured to send a handover command to the UE, where the handover command carries the algorithm used by the UE in the UMTS and the 4LSB of the downlink NAS Count that are obtained by the obtaining module 71.

In the base station, the sending module 72 can carry, in the handover command sent to the UE, the algorithm used by the UE in the UMTS and the 4LSB of the downlink NAS Count, and then, the UE can calculate a CK and an IK according to the obtained 4LSB of the downlink NAS Count, and furthermore, the UE can perform inter-system key negotiation with an MME according to the CK and the IK and perform algorithm negotiation with the MME according to the algorithm used by the UE in the UMTS, so that handover security can be enhanced.

Figure 8:
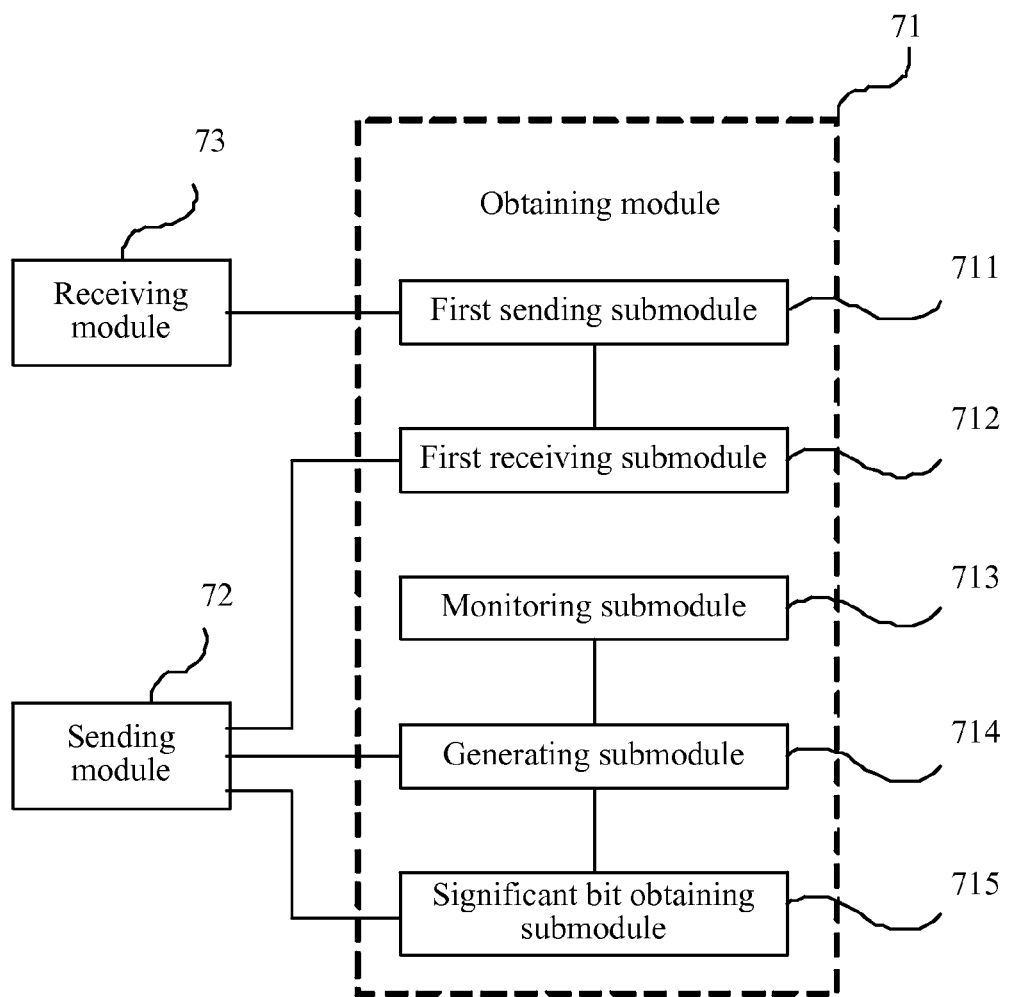
FIG. 8 is a schematic structural diagram of a base station according to another embodiment of the present invention.

FIG. 8 is a schematic structural diagram of a base station according to another embodiment of the present invention, in an implementation manner of this embodiment, the difference between the base station shown in FIG. 8 and the base station shown in FIG. 7 is that the base station shown in FIG. 8 may further include:

a receiving module 73, configured to receive an S1AP message sent by an MME, where the S1AP message carries a security capability of a UE in a UMTS.

Specifically, the obtaining module 71 may include:

a first sending submodule 711, configured to send a handover request message to an RNC, where the handover request message carries the security capability of the UE in the UMTS; and a first receiving submodule 712, configured to receive a handover request acknowledgement message sent by the RNC, where the handover request acknowledgement message carries the algorithm used by the UE in the UMTS, and the algorithm used by the UE in the UMTS is selected by the RNC according to the security capability.

Furthermore, the first sending submodule 711 may further send the handover request message to the MME, where the handover request message carries instruction information for instructing the MME to send 4LSB of a downlink NAS Count;

the first receiving submodule 712 may further receive the 4LSB of the downlink NAS Count that is sent by a mobility management entity according to the instruction information.

In this implementation manner, the obtaining module 71 may further include:

a monitoring submodule 713, configured to monitor and save the downlink NAS Count;

a generating submodule 714, configured to generate a NAS Count according to the downlink NAS Count saved by the monitoring submodule 713; and a significant bit obtaining submodule 715, configured to obtain the 4LSB of the NAS Count generated by the generating submodule 714.

In this implementation manner, the sending module 72 may further send the handover request message to the MME, where the handover request message carries the new NAS Count generated by the generating submodule 714, so that the MME calculates a CK and an IK according to the new NAS Count generated by the generating submodule 714. In this implementation manner, the sending module 72 may further carry, in the handover command sent to the UE, the 4LSB of the new NAS Count generated by the generating submodule 714 and the algorithm used by the UE in the UMTS.

In this way, after the UE receives the handover command, the UE can determine the NAS Count used by the MME according to the 4LSB of the NAS Count that is carried in the handover command and the NAS Count saved by the UE; then the UE can calculate the CK and the IK according to the NAS Count used by the MME and a root key.

In another implementation manner of this embodiment, before sending the handover command, the sending module 72 may further send the handover request message to the MME; the obtaining module 71 may receive a handover request response message sent by the MME, where the handover request response message carries the algorithm used by the UE in the UMTS and the 4LSB of the downlink NAS Count. After receiving the handover request response message sent by the MME, the obtaining module 71 has obtained the algorithm used by the UE in the UMTS and the 4LSB of the downlink NAS Count, and only in this situation the sending module 72 sends the handover command to the UE, and carries the algorithm used by the UE in the UMTS and the downlink NAS Count in the handover command.

In the base station, the sending module 72 can carry, in the handover command sent to the UE, the algorithm used by the UE in the UMTS and the 4LSB of the downlink NAS Count, and then, the UE can calculate the CK and the IK according to the obtained 4LSB of the downlink NAS Count, and furthermore, the UE can perform inter-system key negotiation with the MME according to the CK and the IK and perform algorithm negotiation with the MME according to the algorithm used by the UE in the UMTS, so that handover security can be enhanced.

Figure 9:
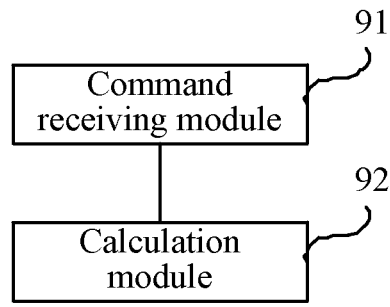
FIG. 9 is a schematic structural diagram of a user equipment according to an embodiment of the present invention.

FIG. 9 is a schematic structural diagram of a user equipment according to an embodiment of the present invention, and the UE in this embodiment can implement a process of the embodiment shown in FIG. 4 of the present invention.

As shown in FIG. 9, the UE may include:

a command receiving module 91, configured to receive a handover command sent by a base station, where the handover command carries an algorithm used by the UE in a UMTS and 4LSB of a downlink NAS Count; and a calculation module 92, configured to calculate a CK and an IK according to the 4LSB of the downlink NAS Count received by the command receiving module 91.

Specifically, the calculation module 92 can determine an NAS Count used by an MME according to the 4LSB of the downlink non-access stratum count received by the command receiving module 91 and the NAS Count saved by the UE, and calculate the CK and the IK according to the NAS Count used by the MME and a root key.

In the user equipment, after the command receiving module 91 receives the handover command sent by the base station, the UE can obtain the algorithm used by the UE in the UMTS and the 4LSB of the downlink NAS Count that are carried in the handover command, and then, the calculation module 92 can calculate the CK and the IK according to the 4LSB of the downlink NAS Count, and furthermore, the UE can perform inter-system key negotiation with the MME according to the CK and the IK and perform algorithm negotiation with the MME according to the algorithm used by the UE in the UMTS, so that handover security can be enhanced.

Figure 10:
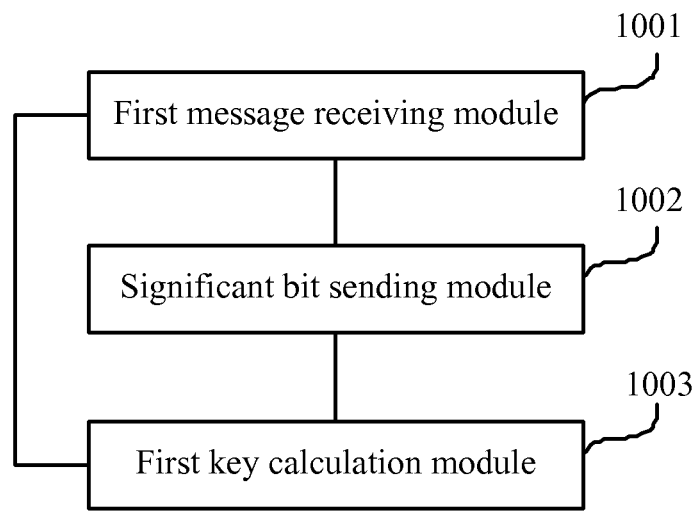
FIG. 10 is a schematic structural diagram of a mobility management entity according to an embodiment of the present invention.

FIG. 10 is a schematic structural diagram of a mobility management entity according to an embodiment of the present invention, and the MME in this embodiment can implement a process of the embodiment shown in FIG. 5 of the present invention.

As shown in FIG. 10, the MME may include:

a first message receiving module 1001, configured to receive a handover request message sent by a base station, where the handover request message carries instruction information for instructing the MME to send 4LSB of a downlink NAS Count; and a significant bit sending module 1002, configured to send the 4LSB of the downlink NAS Count to the base station according to the instruction information received by the first message receiving module 1001.

Furthermore, the MME may further include:

a first key calculation module 1003, configured to calculate a CK and an IK according to a new NAS Count when the instruction information received by the first message receiving module 1001 for instructing the MME to send the 4LSB of the downlink NAS Count is 4LSB of the new NAS Count and the handover request message further carries the new NAS Count, where the new NAS Count is generated by the base station according to a monitored and saved downlink NAS Count.

In the foregoing embodiment, after the first message receiving module 1001 receives the handover request message sent by the base station, the significant bit sending module 1002 sends the 4LSB of the downlink NAS Count to the base station according to the instruction information carried in the handover request message, so that the base station sends the 4LSB to a UE, and then, the UE can calculate the CK and the IK according to the 4LSB sent by the base station, and the first key calculation module 1003 can calculate the CK and the IK according to the downlink NAS Count corresponding to the 4LSB that needs to be sent to the base station, and furthermore, the UE and the MME can perform inter-system key negotiation according to the respectively calculated CKs and IKs, so that handover security can be enhanced.

Figure 11:
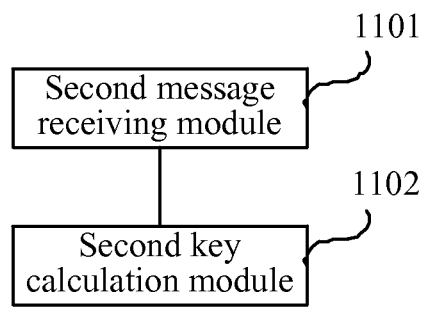
FIG. 11 is a schematic structural diagram of a mobility management entity according to another embodiment of the present invention.

FIG. 11 is a schematic structural diagram of a mobility management entity according to another embodiment of the present invention, and the MME in this embodiment can implement a process of the embodiment shown in FIG. 6 of the present invention.

As shown in FIG. 11, the MME may include:

a second message receiving module 1101, configured to receive a handover request message sent by a base station, where the handover request message carries an NAS Count generated by the base station; and a second key calculation module 1102, configured to calculate a CK and an IK according to the NAS Count generated by the base station and carried in the handover request message that is received by the second message receiving module 1101.

In the foregoing embodiment, the second key calculation module 1102 can calculate the CK and the IK according to the NAS Count generated by the base station, and then the MME can perform inter-system key negotiation with a UE according to the CK and the IK, so that handover security can be enhanced.

A person of ordinary skill in the art can understand that the accompanying drawings are only schematic diagrams of one preferred embodiment, and modules or processes in the accompanying drawings are not necessarily required for implementing the present invention.

A person of ordinary skill in the art can understand that modules in a device in an embodiment can be distributed in the device of the embodiment according to the description of the embodiment, and can also be changed accordingly to be disposed in one or more devices different from this embodiment. The modules of the foregoing embodiments may be combined into one module, or further divided into multiple submodules.

Finally, it should be noted that the foregoing embodiments are merely intended for describing the technical solutions of the present invention other than limiting the present invention. Although the present invention is described in detail with reference to the foregoing embodiments, a person of ordinary skill in the art should understand that he may still make modifications to the technical solutions described in the foregoing embodiments, or make equivalent replacements to some technical features thereof, without departing from the spirit and scope of the technical solutions of the embodiments of the present invention.

What is claimed is:

1. A handover method, comprising:

obtaining an algorithm used by a user equipment in a universal mobile telecommunication system and four least significant bits of a downlink non-access stratum count; and sending a handover command to the user equipment, wherein the handover command carries the algorithm used by the user equipment in the universal mobile telecommunication system and the four least significant bits of the downlink non-access stratum count, wherein the four least significant bits of the downlink non-access stratum count carried in the handover command is used to calculate a cipher key and an integrity key, and the user equipment performs inter-system key negotiation with a mobility management entity (MME) according to the cipher key and the integrity key calculated.

2. The method according to claim 1, wherein before the obtaining the algorithm used by the user equipment in the universal mobile telecommunication system and the four least significant bits of the downlink non-access stratum count, the method further comprises:

receiving an S1 application protocol message sent by the MME when the user equipment accesses a network, wherein the S1 application protocol message carries a security capability of the user equipment in the universal mobile telecommunication system.

3. The method according to claim 2, wherein the obtaining the algorithm used by the user equipment in the universal mobile telecommunication system comprises:

sending a handover request message to a radio network controller, wherein the handover request message carries the security capability of the user equipment in the universal mobile telecommunication system; and receiving a handover request acknowledgement message sent by the radio network controller, wherein the handover request acknowledgement message carries the algorithm used by the user equipment in the universal mobile telecommunication system, and the algorithm used by the user equipment in the universal mobile telecommunication system is selected by the radio network controller according to the security capability.

4. The method according to claim 1, wherein the obtaining the four least significant bits of the downlink non-access stratum count comprises:

sending a handover request message to the MME, wherein the handover request message carries instruction information for instructing the MME to send the four least significant bits of the downlink non-access stratum count; and receiving the four least significant bits of the downlink non-access stratum count sent by the MME according to the instruction information.

5. The method according to claim 1, wherein the obtaining the four least significant bits of the downlink non-access stratum count comprises:

monitoring and saving the downlink non-access stratum count, and generating a new non-access stratum count according to the saved downlink non-access stratum count; and obtaining four least significant bits of the new non-access stratum count.

6. The method according to claim 5, wherein after the generating the new non-access stratum count according to the saved downlink non-access stratum count, the method further comprises:
   sending the handover request message to the mobility management entity, wherein the handover request message carries the new non-access stratum count, and the new non-access stratum count is used for the MME to calculate the cipher key and the integrity key according to the new non-access stratum count.

7. The method according to claim 1, wherein before the sending the handover command to the user equipment, the method further comprises:
   sending a handover request message to a mobility management entity; and
   receiving a handover request response message sent by the MME, wherein the handover request response message carries the algorithm used by the user equipment in the universal mobile telecommunication system and the four least significant bits of the downlink non-access stratum count.

8. A handover method, comprising:
   receiving, by a user equipment, a handover command sent by a base station, wherein the handover command carries an algorithm used by the user equipment in a universal mobile telecommunication system and four least significant bits of a downlink non-access stratum count; and
   calculating, by the user equipment, a cipher key and an integrity key according to the four least significant bits of the downlink non-access stratum count carried in the handover command so as to allow inter-system key negotiation to be performed with a mobility management entity (MME) using the cipher key and the integrity key calculated.

9. The method according to claim 8, wherein the calculating, by the user equipment, the cipher key and the integrity key according to the four least significant bits of the downlink non-access stratum count comprises:
   determining, by the user equipment, a non-access stratum count used by a mobility management entity, according to the four least significant bits of the downlink non-access stratum count that are carried in the handover command and a downlink non-access stratum count saved by the user equipment; and
   calculating, by the user equipment, the cipher key and the integrity key, according to the non-access stratum count used by the MME and a root key.

10. A handover method, comprising:
   receiving, by a mobility management entity (MME), a handover request message sent by a base station, wherein the handover request message carries instruction information for instructing the MME to send four least significant bits of a downlink non-access stratum count; and
   sending, by the MME, the four least significant bits of the downlink non-access stratum count to the base station according to the instruction information.

11. The method according to claim 10, wherein
   the instruction information for instructing the MME to send the four least significant bits of the downlink non-access stratum count is four least significant bits of a new non-access stratum count, and the new non-access stratum count is generated by the base station according to a monitored and saved downlink non-access stratum count; and
   if the handover request message further carries the new non-access stratum count, the method further comprises:
   calculating, by the mobility management entity, the cipher key and the integrity key according to the new non-access stratum count.

12. The method according to claim 10, wherein after the receiving, by the mobility management entity, the handover request message sent by the base station, the method further comprises:
   sending, by the mobility management entity, a handover request response message to the base station, wherein the handover request response message carries the algorithm used by the user equipment in the universal mobile telecommunication system and the four least significant bits of the downlink non-access stratum count.

13. A base station, comprising:
   an obtaining module, configured to obtain an algorithm used by a user equipment in a universal mobile telecommunication system and four least significant bits of a downlink non-access stratum count; and
   a sending module, configured to send a handover command to the user equipment, wherein the handover command carries the algorithm used by the user equipment in the universal mobile telecommunication system and the four least significant bits of the downlink non-access stratum count,
   wherein the four least significant bits of the downlink non-access stratum count carried in the handover command is used to calculate a cipher key and an integrity key, and the user equipment performs inter-system key negotiation with a mobility management entity (MME) using the cipher key and the integrity key calculated.

14. The base station according to claim 13, further comprising:
   a receiving module, configured to receive an S1 application protocol message sent by the MME, wherein the S1 application protocol message carries a security capability of the user equipment in the universal mobile telecommunication system.

15. The base station according to claim 14, wherein the obtaining module comprises:
   a first sending submodule, configured to send a handover request message to a radio network controller, wherein the handover request message carries the security capability of the user equipment in the universal mobile telecommunication system; and
   a first receiving submodule, configured to receive a handover request acknowledgement message sent by the radio network controller, wherein the handover request acknowledgement message carries the algorithm used by the user equipment in the universal mobile telecommunication system, and the algorithm used by the user equipment in the universal mobile telecommunication system is selected by the radio network controller according to the security capability.

16. The base station according to claim 15, wherein
   the first sending submodule is further configured to send a handover request message to the mobility management entity, wherein the handover request message carries instruction information for instructing the MME to send the four least significant bits of the downlink non-access stratum count; and
   the first receiving submodule is further configured to receive the four least significant bits of the downlink non-access stratum count sent by the MME according to the instruction information.

17. The base station according to claim 13, wherein the obtaining module further comprises:
- a monitoring submodule, configured to monitor and save the downlink non-access stratum count;
- a generating submodule, configured to generate a new non-access stratum count according to the downlink non-access stratum count saved by the monitoring submodule; and
- a significant bit obtaining submodule, configured to obtain 4LSB of the new non-access stratum count generated by the generating submodule.

18. The base station according to claim 17, wherein
the sending module is further configured to send the handover request message to the mobility management entity, wherein the handover request message carries the new non-access stratum count generated by the generating submodule, and the new non-access stratum count is used for the MME to calculate a cipher key and an integrity key according to the new non-access stratum count generated by the generating submodule.

19. The base station according to claim 13, wherein
the sending module is further configured to, before sending the handover command, send a handover request message to a mobility management entity; and
the obtaining module is further configured to, before the sending module sends the handover command, receive a handover request response message sent by the mobility management entity, wherein the handover request response message carries the algorithm used by the user equipment in the universal mobile telecommunication system and the four least significant bits of the downlink non-access stratum count.

20. A user equipment, comprising:
- a command receiving module, configured to receive a handover command sent by a base station, wherein the handover command carries an algorithm used by the user equipment in a universal mobile telecommunication system and four least significant bits of a downlink non-access stratum count; and
- a calculation module, configured to calculate a cipher key and an integrity key using the four least significant bits of the downlink non-access stratum count carried in the handover command, wherein inter-system key negotiation with a mobility management entity (MME) is performed using the cipher key and the integrity key calculated.

21. The user equipment according to claim 20, wherein
the calculation module is specifically configured to determine a non-access stratum count used by the MME according to the four least significant bits of the downlink non-access stratum count that are received by the command receiving module and a downlink non-access stratum count saved by the user equipment, and calculate the cipher key and the integrity key according to the non-access stratum count used by the MME and a root key.

22. A mobility management entity (MME), comprising:
- a first message receiving module, configured to receive a handover request message sent by a base station, wherein the handover request message carries instruction information for instructing the MME to send four least significant bits of a downlink non-access stratum count; and
- a significant bit sending module, configured to send the four least significant bits of the downlink non-access stratum count to the base station according to the instruction information received by the first message receiving module.

23. The mobility management entity according to claim 22, further comprising:
- a first key calculation module, configured to calculate a cipher key and an integrity key according to a new non-access stratum count when the instruction information received by the first message receiving module for instructing the MME to send the four least significant bits of the downlink non-access stratum count is four least significant bits of the new non-access stratum count and the handover request message further carries the new non-access stratum count, wherein the new non-access stratum count is generated by the base station according to a monitored and saved downlink non-access stratum count.

24. A system comprising:
a mobility management entity; and
a base station, the base station comprising:
an obtaining module, configured to obtain an algorithm used by a user equipment in a universal mobile telecommunication system and four least significant bits of a downlink non-access stratum count, and
a sending module, configured to send a handover command to the user equipment, wherein the handover command carries the algorithm used by the user equipment in the universal mobile telecommunication system and the four least significant bits of the downlink non-access stratum count that are obtained by the obtaining module,
wherein the mobility management entity, comprising:
- a first message receiving module, configured to receive a handover request message sent by the base station, wherein the handover request message carries instruction information for instructing the MME to send four least significant bits of a downlink non-access stratum count; and
- a significant bit sending module, configured to send the four least significant bits of the downlink non-access stratum count to the base station according to the instruction information received by the first message receiving module.

* * * * *